United States Patent

Cook, III

Patent Number: 5,620,255
Date of Patent: Apr. 15, 1997

[54] TEMPERATURE MEASUREMENT AND DISPLAY OF THE TEMPERATURE OF A COOKING SURFACE

[76] Inventor: Walter R. Cook, III, 214.5 LaVerne Ave., Long Beach, Calif. 90803

[21] Appl. No.: 510,240

[22] Filed: Aug. 2, 1995

Related U.S. Application Data

[62] Division of Ser. No. 139,830, Oct. 22, 1993, Pat. No. 5,441,344.

[51] Int. Cl.⁶ .............................. G01K 1/02; G01K 1/14; G01K 13/00; G01K 7/04
[52] U.S. Cl. ........................ 374/141; 374/179; 374/157; 99/342
[58] Field of Search ................................ 374/208, 179, 374/180, 141, 157; 99/342

[56] References Cited

U.S. PATENT DOCUMENTS

| | | | |
|---|---|---|---|
| 1,994,268 | 3/1935 | Bartels | 374/141 |
| 2,136,055 | 11/1938 | Miller | 374/180 |
| 2,141,759 | 12/1938 | Moffat | 374/141 |
| 2,219,950 | 10/1940 | Childs | 374/141 |
| 2,750,916 | 6/1956 | Hanington | 374/141 |
| 3,155,237 | 11/1964 | Mai | 374/179 |
| 3,405,678 | 10/1968 | Frenkel et al. | 374/141 |
| 4,156,365 | 5/1979 | Heinmets et al. | 374/141 |
| 4,541,733 | 9/1985 | Andre | 374/149 |

FOREIGN PATENT DOCUMENTS

| | | | |
|---|---|---|---|
| 0486858 | 11/1929 | Germany | 374/141 |
| 406137955 | 5/1994 | Japan | 374/141 |
| 1591038 | 6/1981 | United Kingdom | 374/141 |

Primary Examiner—Diego F. F. Gutierrez
Attorney, Agent, or Firm—A. M. Fernandez

[57] ABSTRACT

Measurement and display of the temperature of a cooking surface of a cooking utensil is provided by a temperature sensor, such as a thermocouple in thermal contact either directly with the cooking surface or through a clamp on the side of the cooking utensil in close proximity to the cooking surface, and a temperature measuring and display electrically connected to the temperature sensor and located on the handle of the cooking utensil or on the upper end of the clamp for convenient viewing of the temperature of the cooking surface at a location away from the temperature sensor.

3 Claims, 4 Drawing Sheets

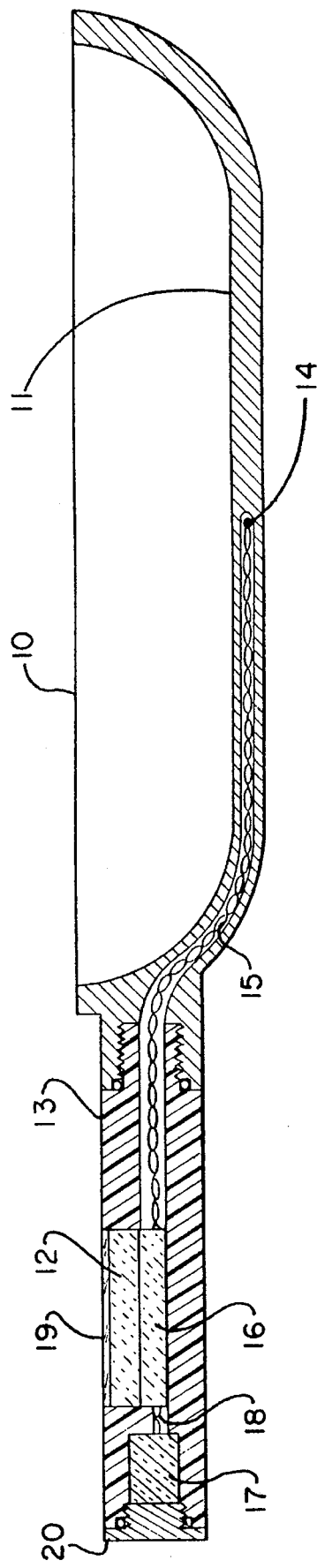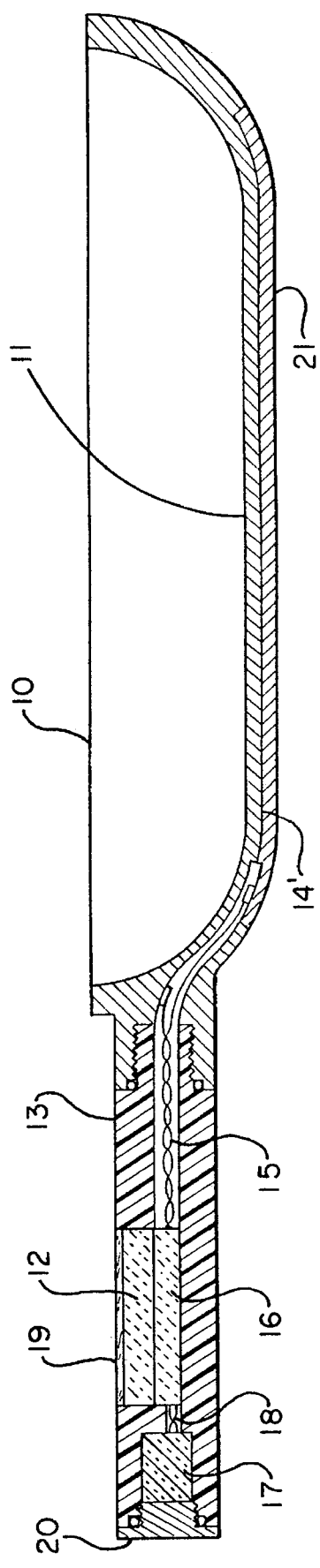

TEMPERATURE MEASUREMENT AND DISPLAY OF THE TEMPERATURE OF A COOKING SURFACE

This application is a divisional of application Ser. No. 08/139,830, filed Oct. 22, 1993, now U.S. Pat. No. 5,441,344.

FIELD OF THE INVENTION

The invention relates to measurement and display of the cooking surface temperature of utensils, such as pots, pans, griddles and the like, which cook food primarily through direct surface contact.

BACKGROUND OF THE INVENTION

The importance of maintaining the cooking temperature of a utensil at a proper temperature is well known. However, in most cases the cooking temperature is not known because there is not readily available a way of measuring it. In the past, most techniques employed for temperature measurement and display have measured the temperature within the cooking utensil indirectly, such as by a device placed on a handle or lid of the utensil. U.S. Pat. Nos. 2,750,916 and 3,736,861 are representative of this indirect technique of measuring temperature for display on the handle of the utensil, and U.S. Pat. Nos. 1,863,918 and 4,509,868 are representative of this indirect technique of measuring temperature for display on the lid of the utensil.

The problem is that since these indirect techniques do not measure the temperature of the utensil's cooking surface, which would be at a higher temperature than is being indicated, the cook may tend to turn the heating plate or burner up to compensate and inadvertently increase the cooking surface above the optimum temperature required to prepare the food.

Temperature regulating thermostats have been provided for waffle irons, but there temperature is regulated only indirectly by placing the thermostat in close proximity to the cooking surface. In waffle irons there are two opposing surfaces, and the temperature that should be controlled is in the space between them. However, it is acceptable to measure temperature indirectly at a site on one side or the other of the pair of waffle plates as shown for example in U.S. Pat. No. 2,159,068. The cooking temperature for waffles is not as critical as for other foods such as for cooking meat.

For cooking food by direct contact with a utensil's surface, such as a pan or griddle, it is necessary to measure the temperature of the cooking surface directly in order to ensure that the proper cooking temperature is being maintained, not only for the cooked food to have the proper taste, but also for the cooked food to be free of all bacteria.

STATEMENT OF THE INVENTION

An object of this invention is to provide apparatus for measurement and display of the cooking surface temperature of a cooking utensil in order that a person using the cooking utensil may ascertain that the surface has reached the proper cooking temperature, and that the proper temperature is maintained during the time necessary for properly cooking the food. A further object is to provide as an accessory to a cooking utensil an instrument that can be easily attached and detached for measurement and quantitative display of the utensil's cooking temperature.

These and other objects and advantages of the invention are achieved by affixing a temperature sensing means for producing a voltage proportional to temperature sensed, such as a thermocouple, to the cooking utensil in thermal contact with the cooking surface thereof and through electrically insulated leads connecting the device to a voltage measuring and display means for quantitative measurement of temperature, preferably through digital display means. Although a thermocouple is disclosed as the temperature sensing device of choice, it should be understood that the cooking surface temperature could be sensed with other types of transducers besides a thermocouple, such as a resistance temperature detector (RTD), i.e., a thermistor, used in a four-arm bridge connected to a stable voltage source across two opposing junctions for producing a voltage across the remaining two junctions that is proportional to temperature sensed. For convenience, a thermocouple is illustrated and referred to throughout as an example of a temperature sensitive means for producing a voltage proportional to temperature sensed at a point in direct thermal contact to the cooking surface of a cooking utensil, where "direct thermal contact" is defined to mean in contact with the cooking surface per se or in contact with the wall of that cooking surface or an extension of the wall of that cooking surface.

The thermocouple is permanently affixed in direct thermal contact with the cooking surface, preferably at the center, and the quantitative measurement and display means utilizing an integrated circuit is disposed on the handle of the cooking utensil. Alternatively, the thermocouple may be made as an integral part of the bottom of the cooking utensil, such as when the underside of the cooking surface is made using two layers of dissimilar metals, such as aluminum or copper, to more rapidly and uniformly distribute heat from the heating plate or burner at the center to the entire cooking surface made of stainless steel, for example. Since a thermocouple is formed at the junction of dissimilar metals, the thermocouple needed for temperature measurement and display is provided by the entire bottom of the utensil, the upper surface of which is used directly for cooking. Insulated wire connections are made separately from the dissimilar metals of the thermocouple to the integrated circuit which converts the voltage difference developed across the two wires directly to a quantitative voltage display calibrated to represent units of temperature sensed. The cooking surface is thus used as part of the thermocouple junction needed to directly measure temperature of that surface.

For an accessory that may be temporarily attached to any cooking utensil, the thermocouple is permanently affixed in direct thermal contact to a metal pad on a part of a clamp placed over the edge of the utensil, such as a frying pan. That part of the clamp is extended from the pad to form a major arm of the clamp on which the integrated circuit voltage measuring and display means is mounted. The metal of the pad is selected to have a high coefficient of thermal conduction, such as copper or aluminum, so that when the clamp is placed on the cooking utensil the thermocouple on the pad is in direct thermal contact with the cooking utensil.

Alternatively, the opposing arm of the clamp may be provided with the heat conductive pad with the thermocouple affixed in direct thermal contact to it. Thermocouple leads to the integrated circuit measuring and display means may then be crossed over to the major arm, or else that opposing arm is instead extended to be the major arm that supports the temperature measuring and display means. In either case, the major arm of the clamp may carry the insulated thermocouple leads directly from the thermocouple in direct thermal contact with the inside surface of the utensil to the integrated circuit measuring and display means. In each case, the major arm is preferably of sufficient length to place the integrated circuit voltage measuring and display means at a distance from the cooking utensil for the protection of the integrated circuit from the heat of the cooking surface and the heating plate or burner.

BRIEF DESCRIPTION OF DRAWINGS

FIG. 2 is a cross-section view of the pan in FIG. 1 taken along a line 2—2 to show the thermocouple, the integrated circuit voltage measuring and display means, and the leads coupling one to the other.

FIG. 3 is a cross-section view of the pan in FIG. 1 having a bimetallic bottom taken along the same line 2—2.

DESCRIPTION OF PREFERRED EMBODIMENTS

Figure 1:
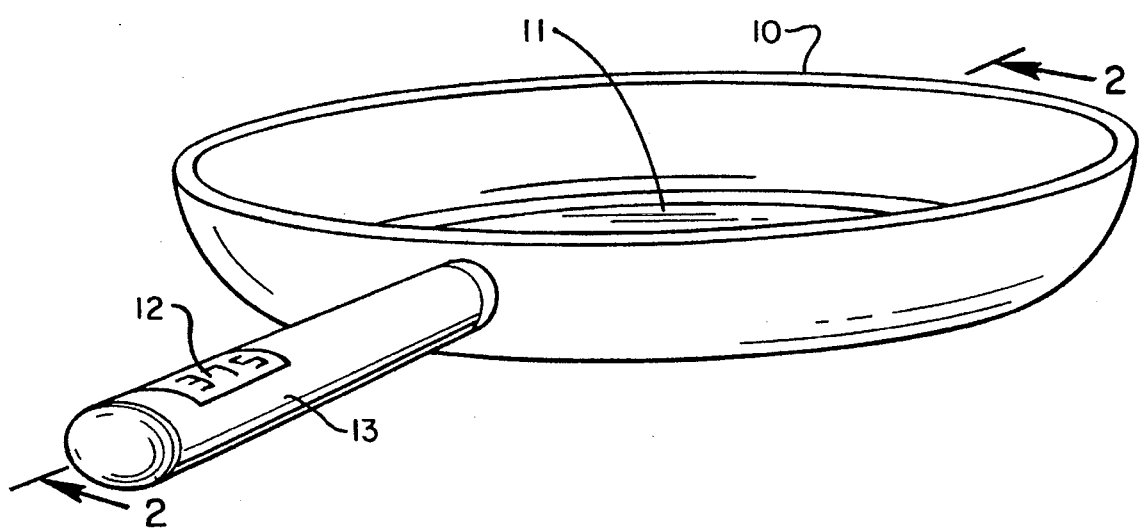
FIG. 1 is a perspective view of a pan having a thermocouple (not shown) attached in direct thermal contact to the bottom of the pan and integrated circuit voltage measuring and display means mounted on the handle and connected by insulated wire leads to the thermocouple.

Referring to FIGS. 1 and 2, a frying pan 10 is illustrated as the most common type of utensil used for cooking food in direct contact with the surface 11, the temperature of which is to be sensed and measured for display in a panel 12, such as a liquid crystal display (LCD) panel mounted in the handle 13 of the pan. Sensing the temperature of the surface 11 is carried out by a thermocouple 14 embedded just below the cooking surface in the bottom of the pan at approximately the center. Electrically insulated wire leads 15, are also embedded in the bottom of the pan or passed through a channel in the pan and extended through a channel into the handle 13 made of plastic, such as a Bakelite material comprising polypropylene protected from degrading by heat and light.

The thermocouple is preferably of type K which, as is well known, provides an approximately linear relationship between temperature and the output voltage developed across the dissimilar metals of the thermocouple junction. The thermocouple leads 15 are connected to an integrated circuit voltage measurement and display means 16 mounted in the handle. That integrated circuit means 16 receives power from a battery 17 via wires 18. Although a 9 volt battery is listed hereinafter as one of the suggested parts for implementation of the invention, in practice, the battery may consist of two or more AA or AAA batteries connected in series by proper design of the battery holder and integrated circuit.

The integrated circuit means 16 is connected to drive the adjacent liquid crystal display 12 for display of the temperature measurement. All of this electronic temperature measuring and display system will be described in detail with reference to FIG. 6. It is protected from the external environment by the pan itself together with the watertight fitting handle 13 threaded into the pan, a watertight transparent cover 19 over the display panel and a watertight cap 20 closing the battery compartment.

An alternative embodiment of the cooking utensil 10 is illustrated in FIG. 3 where elements referred to in FIG. 2 are shown in the same place and identified by the same reference numerals. The difference is that the thermocouple 14' is formed by the junction between a thin sheet of metal, such as stainless steel, forming the cooking surface of the utensil 10 and a dissimilar metal 21, such as aluminum or copper, across the entire bottom of the pan. It is an advantage to form the thermocouple in that manner because many cooking utensils are already constructed with one thick metal layer 21 on the bottom of the pan made of a corrosion resistant metal. The thick bottom layer provides good thermal conduction, and the thin sheet of corrosion resistant provides a cooking surface that is durable and easily cleaned using abrasive cleaners if necessary.

Figure 5:
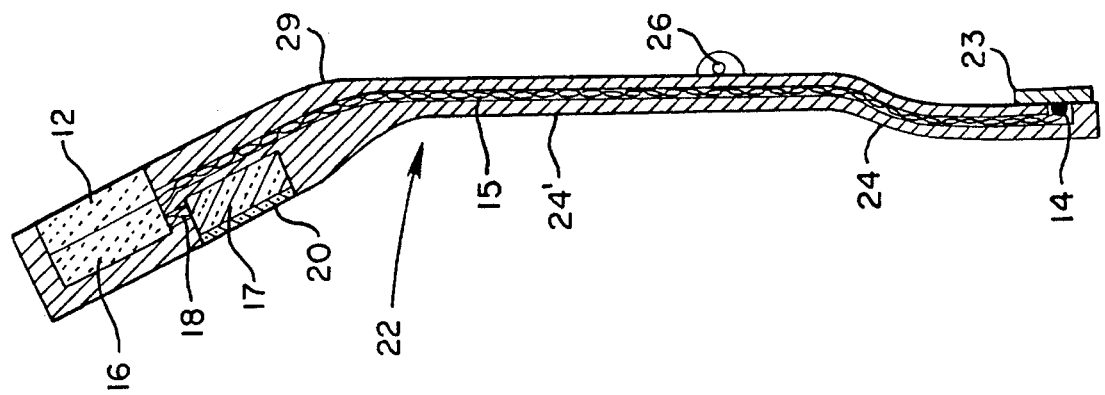
FIG. 5 is a longitudinal cross section of the main arm of the clamp shown in FIG. 4.
Figure 4:
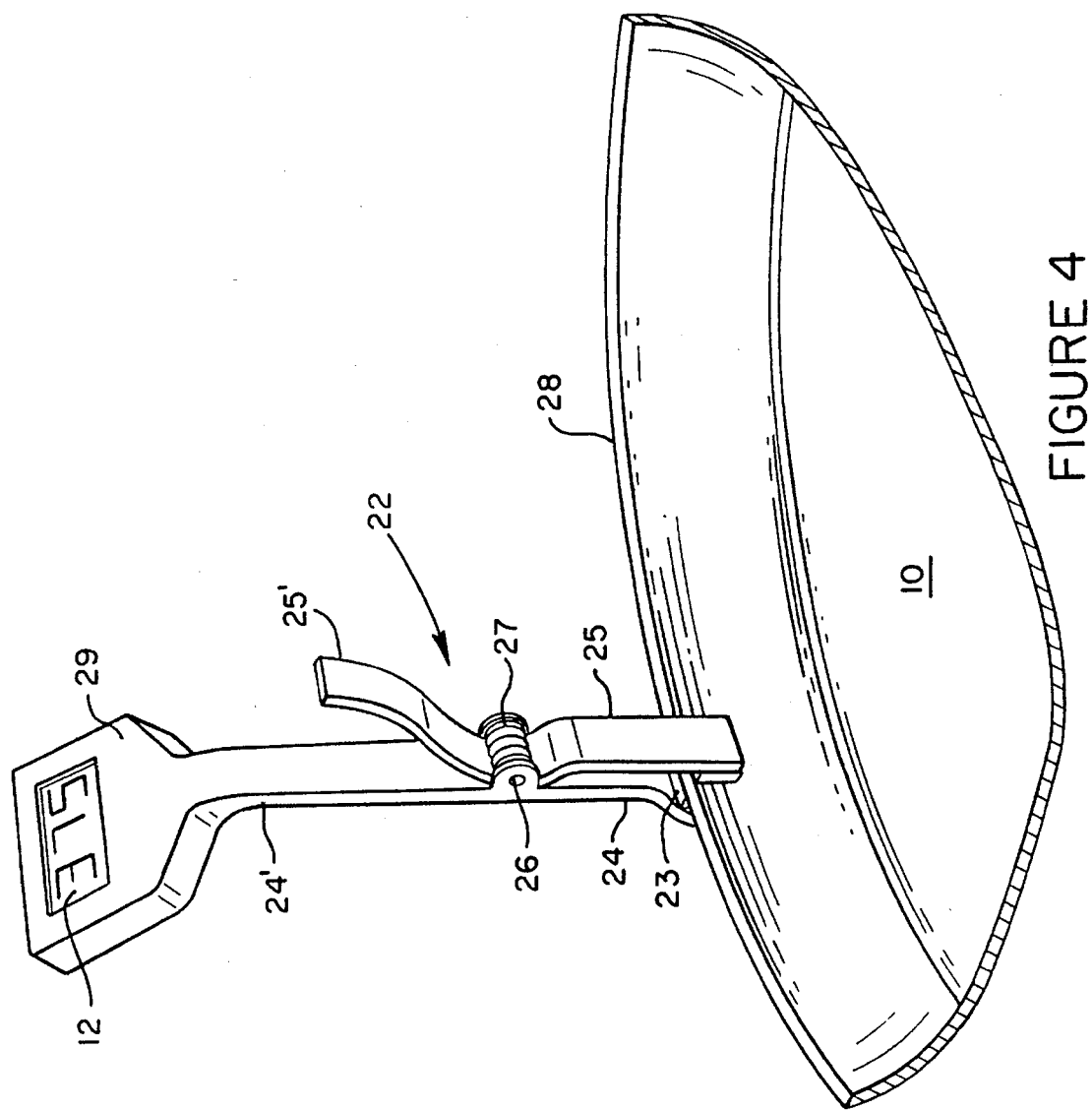
FIG. 4 illustrates a clamp for temporarily attaching a thermocouple in direct thermal contact with a cooking utensil near the bottom with the major portion of the cooking utensil broken away.

Yet another alternative allows the present invention to be used on cooking utensils already in existence by using a clamp 22 shown in FIG. 4 and placing the thermocouple in a pad 23 of high thermal conductivity, such as copper or aluminum at the end of an arm 24 of the clamp. Another arm 25 pivoted on a pin 26 is biased toward the first arm 24 by a spring 27. The arms 24 and 25 are extended upwardly, so that when the upper parts 24' and 25' are pressed toward each other, the end of the clamp with the pad 23 may be placed over the edge 28 of the cooking utensil as shown. The upper part 25' of the arm 25 is bent forward, away from the upper part 24' of the arm 24 to facilitate this action of placing the clamp over the edge of the cooking utensil. A broad part 29 at the upper end of the arm 24 accommodates the display panel 12 behind which the integrated circuit voltage measurement and display means 16 is housed together with batteries 17 and connected by leads 18 as shown in FIG. 5. The thermocouple 14 in direct contact with the pad 23 is connected to the voltage measuring and display means 16 by the insulated wire leads 15.

Figure 6:
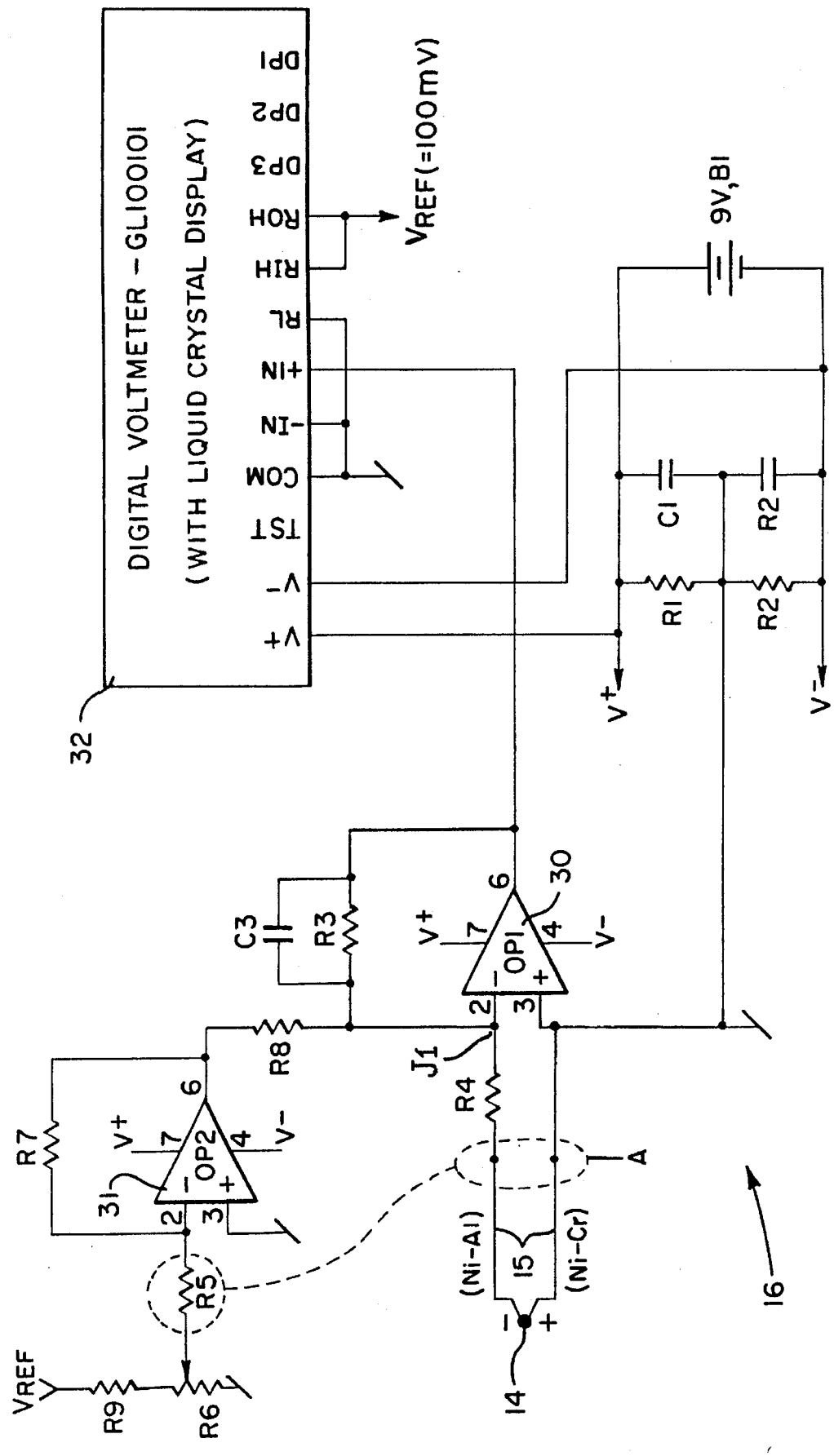
FIG. 6 is a schematic diagram of the thermocouple voltage measurement and display system in each of FIGS. 1 through 5.

The integrated circuit voltage measurement and display means 16 will now be described with reference to FIG. 6 which shows the thermocouple 14 connected by a pair of insulated wire leads 15 to an operational amplifier 30. The voltage input (difference in voltage between the pair of leads 15) is amplified by the operational amplifier 30 connected as a feedback amplifier by a negative feedback resistor R3 to a summing junction J1 at the negative input terminal of the amplifier. A reference voltage Vref and circuit ground are connected to the summing junction J1 by an operational ampliflier 31 and resistors R5 through R9. Gain of the feedback amplifier comprising the amplifier 30, the RC feedback provided by resistor R3 and capacitor C3 and input resistor R4 is chosen such that the voltage output of the amplifier 30 varies approximately 0.1 mV for every degree Fahrenheit of temperature difference between the thermocouple 14 and a point A at which the thermocouple insulated wire leads 15 terminate in the handle 13 or the clamp 22 on the pan 10.

An amplifier 31 with a negative feedback resistor R7 is connected by a thermistor R5 to a source of reference voltage comprising a trim potentiometer R6 and a resistor R9 connected in series between a fixed source of voltage Vref and circuit ground. Amplifier 31, thermistor R5 and resistors R6 through R9 add to the output of the amplifier 30 a voltage of 0.1 mV for every degree of temperature Fahrenheit at point A. The total output of that voltage measuring means (amplifiers 30 and 31 and resistors R3–R9) therefore represents the temperature of the thermocouple junction 14 calibrated in units of 0.1 mV per degree Fahrenheit. The parts appropriate for use with a K-type thermocouple are as follows:

| | |
|---|---|
| VREF | 9 volt battery such as Duracell MN1604 |
| C1,C2,C3 | 0.22 µFd each |
| Digital Voltmeter | Ottotek GL100101 with LCD display |
| Operational Amplifier 31, 32 | National LMC6061 |
| R1,R2,R3,R8 | 499 kohm each |
| R4 | 112 kohm |
| R5 | type 44008 thermistor (35.7 kohm @ 21° C.) |
| R6 | 50 kohm trim potentiometer |
| R7 | 82 kohm |
| R9 | 450 kohm |

The output of the voltage measuring means comprising amplifiers 30 and 31 and resistors R3 through R9 is connected to the input of a digital voltmeter 32 which displays the voltage on a liquid crystal display panel in unit increments of voltage calibrated in units of 0.1 mV per degree Fahrenheit. The output of amplifier 30 is thus displayed on the LCD panel of the digital voltmeter 32. The displayed value thus approximately equates to the temperature sensed by the thermocouple in degree Fahrenheit. Compensation for errors induced by possible offset voltages of amplifiers 30 and 31 is made by adjustment of the potentiometer R6. The entire circuit, including the power supply circuit comprising resistor R1, R2, and capacitors C1 and C2 operates on only 175 µA of battery current using integrated circuits for the amplifiers 30, 31 and digital voltmeter 32 with the LCD. In practice, the operational amplifiers 30 and 31 and voltmeter 32 could be fabricated on a single integrated circuit chip for compactness and even lower current requirement.

Aside from the importance of being able to assure the proper cooking temperature for health reasons, an advantage of this invention is that it provides valuable feedback to the chef to allow quick learning of the preferred cooking temperature and easy reproduction of that temperature. The availability of utensils and accessories utilizing this invention will naturally encourage the inclusion in recipes of the preferred surface cooking temperature, and this will enhance the chef's chances of success in first attempts at these new recipes. Finally, the present invention will help even the most experienced chefs avoid the common error of beginning to cook on a utensil surface which is not heated to the proper temperature.

While the foregoing description of the invention contains many specificities, these should not be construed as limiting the scope of the invention but as merely providing illustrations of some possible embodiments. For example, the cooking surface temperature measurement could be made with other types of transducers besides a thermocouple, including a resistance temperature detector (RTD), and multiple transducers may be employed. In addition, there are many choices of materials (other than the copper-stainless steel combination mentioned above) for construction of a utensil which also allow the utensil, including the cooking surface itself, to be used as part of a thermocouple circuit.

Further, the temperature display could be located in any easily viewed location on the utensil, not necessarily the handle.

Consequently, the scope of the invention should be determined from the appended claims and their legal equivalents rather than by the examples given.

I claim:

1. Apparatus removably affixed to a cooking utensil by a clamp placed over an edge of a surface of said cooking utensil for measurement and display of a temperature of said cooking surface of said cooking utensil, said clamp comprising a first arm and a second arm, said second arm being pivoted on a pin held by said first arm and spring biased toward said first arm at a clamping end, thereby rendering said clamp removable from said cooking utensil, a temperature sensing means at said clamping end of said first arm in thermal contact with said cooking surface for producing a voltage proportional to said surface temperature, means connected to said temperature sensing means for quantitative measurement of said voltage produced proportional to said cooking surface temperature, and conversion means electrically connected to said quantitative voltage measurement means for converting and displaying said quantitative measurement of said voltage into a display of temperature measurement in calibrated units of temperature corresponding to the temperature of said cooking surface, said conversion means being mounted for viewing said display on said clamp, said clamp having a pad of high thermal conductive material at said clamping end of said first arm, said pad having said temperature sensing means embedded therein, whereby said sensing means produces said voltage directly proportional to temperature of said cooking surface, a pair of insulated electrical leads coupling said voltage of said temperature sensing means to said quantitative voltage measurement means, and said first arm of said clamp is extended away from said clamping end thereof to provide an extended part of said first arm on which said quantitative measurement means and said conversion means are mounted at a location remote from said cooking surface.

2. Apparatus as defined in claim 1 wherein said cooking surface has an upwardly extending wall, and said extended part of said first arm is bent back at its distal end away from said cooking utensil to provide a distal part of said first arm and said display of temperature measurement in calibrated units of temperature is provided on an upper surface of said distal part of said first arm for facile viewing.

3. Apparatus as defined in claim 2 wherein said pair of insulated electrical leads coupling said quantitative voltage measurement means to said temperature sensing means pass through said one extended clamp arm.

\* \* \* \* \*